United States Patent
Sambasivam et al.

(10) Patent No.: US 9,346,982 B2
(45) Date of Patent: May 24, 2016

(54) AMPHIPHILIC PRESSURE SENSITIVE ADHESIVES FOR HUMAN SKIN ADHESION

(75) Inventors: Mahesh Sambasivam, Pennington, NJ (US); Xiang Yu, San Antonio, TX (US); Joseph C Salamone, San Antonio, TX (US); Ann Beal Salamone, San Antonio, TX (US)

(73) Assignee: CONVATEC TECHNOLOGIES INC., Las Vegas, NV (US)

( * ) Notice: Subject to any disclaimer, the term of this patent is extended or adjusted under 35 U.S.C. 154(b) by 0 days.

(21) Appl. No.: 13/210,038

(22) Filed: Aug. 15, 2011

(65) Prior Publication Data

US 2012/0208974 A1 Aug. 16, 2012

Related U.S. Application Data

(60) Provisional application No. 61/373,951, filed on Aug. 16, 2010.

(51) Int. Cl.
*C09J 133/26* (2006.01)
*C09J 133/08* (2006.01)
*C09J 139/04* (2006.01)

(52) U.S. Cl.
CPC ............. *C09J 133/26* (2013.01); *C09J 133/08* (2013.01); *C09J 139/04* (2013.01)

(58) Field of Classification Search
CPC ...... C09J 133/04; C09J 133/08; C09J 133/10; C09J 133/14; C09J 133/26
See application file for complete search history.

(56) References Cited

U.S. PATENT DOCUMENTS

| | | | | |
|---|---|---|---|---|
| 4,181,752 A | * | 1/1980 | Martens et al. | 427/516 |
| 4,379,201 A | | 4/1983 | Heilmann et al. | |
| 5,612,136 A | * | 3/1997 | Everaerts et al. | 428/355 AK |
| 6,855,386 B1 | | 2/2005 | Daniels et al. | |
| 2004/0242770 A1 | | 12/2004 | Feldstein et al. | |
| 2006/0052545 A1 | | 3/2006 | Guerret et al. | |
| 2007/0182898 A1 | * | 8/2007 | Yamaoka et al. | 349/117 |
| 2008/0058475 A1 | | 3/2008 | Schmidt et al. | |
| 2009/0274748 A1 | | 11/2009 | Kawamura et al. | |
| 2011/0217542 A1 | * | 9/2011 | Moroishi et al. | 428/323 |

FOREIGN PATENT DOCUMENTS

| | | | | |
|---|---|---|---|---|
| JP | 50049336 A | * | 5/1975 | |
| JP | 07150125 A | * | 6/1995 | ............. C09J 133/08 |
| WO | WO 00/78885 A1 | | 12/2000 | |
| WO | WO 2005/005491 | | 1/2005 | |
| WO | WO 2005/033198 A1 | | 4/2005 | |
| WO | WO 2010/018766 | * | 2/2010 | |
| WO | WO 2012/024273 A1 | | 2/2012 | |

OTHER PUBLICATIONS

English Translation of JP 07150125 A; Jun. 1995; Okinaga.*
Australian Patent Application No. 2011292135 Patent Examination report No. 1 issued Feb. 16, 2015.
New Zealand Patent Application No. 608323 Further Examination Report issued Jan. 28, 2015.
PCT/US2011/047878 International Preliminary Report on Patentability issued Feb. 19, 2013.
PCT/US2011/047878 Written Opinion completed Dec. 20, 2011.
PCT/US2011/047878 International Search Report completed Dec. 20, 2011.

* cited by examiner

*Primary Examiner* — Robert C Boyle
(74) *Attorney, Agent, or Firm* — Wilson Sonsini Goodrich & Rosati

(57) ABSTRACT

The present invention relates to amphiphilic pressure sensitive adhesives, specifically, pressure sensitive adhesives with amphiphilic copolymers which improve adhesion under moist environment. The amphiphilic copolymers comprise at least one hydrophobic acrylic monomer or oligomer and at least one hydrophilic or amphiphilic monomer or oligomer. The present invention also relates to the use of such adhesives in securing medical devices to human skin.

4 Claims, No Drawings

AMPHIPHILIC PRESSURE SENSITIVE ADHESIVES FOR HUMAN SKIN ADHESION

BACKGROUND OF THE INVENTION

Pressure sensitive adhesives are widely used to attach medical devices such as ostomy appliances, wound dressings, infusion devices, and intravenous fluid lines to the body. These adhesives are biocompatible, gentle on the skin, and securely attach medical devices to the body when the environment is dry. Commonly used pressure sensitive adhesives are based on acrylates, polyolefins, and styrenic block copolymers. While these adhesives adhere well under dry conditions, under moist conditions such as during skin perspiration, these hydrophobic adhesives lose their adhesion to skin, which can lead to the device detaching from the body prematurely.

There is a need to improve the adhesion of adhesives used to attach medical devices to skin in the presence of moisture. Traditionally, adhesion under moist environment has been accomplished by adding water absorbing fillers such as hydrocolloids to pressure sensitive adhesives. The hydrocolloid fillers absorb moisture and soften, providing wet tack, thereby improving the adhesion to skin longer. However, the disadvantages of this approach are the reduction in the dry adhesion (tack) of the adhesive due to the presence of hard fillers. In addition, because of the affinity of the fillers for water, they dissolve and leach out of the adhesive, which can leave a slimy residue on the skin after the device removal.

It is desirable to have a pressure sensitive adhesive for securing medical device to human skin or body such that the adhesive possesses high dry adhesion (tack), high cohesive strength, high wet adhesion (maintain adhesion even under moist condition), and does not leach out components or leave a residue.

PRIOR ART

US 2006/0052545 A1 discloses an adhesive composition for moist medium adhesion based on a block copolymer of hydrophilic and hydrophobic blocks. The hydrophobic block is a long chain acrylate such as butyl acrylate and hexyl acrylate, and the hydrophilic block is selected from acrylic acid, methacrylic acid, acrylamide, and methacrylamide.

U.S. Pat. No. 6,855,386 B1 discloses a wet stick pressure sensitive adhesive comprising a product of 30-70% by weight (meth)acrylate ester monomer, 30-70% by weight of a hydrophilic acidic monomer, and 10-100% of the sum of the above two components of a non-reactive plasticizing agent.

US 2008/0058475 A1 discloses an amphiphilic block copolymer useful for applications requiring absorption or permeation of hydrophilic fluids comprising hydrophobic end blocks and a hydrophilic middle block.

U.S. Pat. No. 5,612,136 A1 discloses a pressure sensitive adhesive composition based on a crosslinked copolymer of (meth)acrylate esters, nitrogen containing basic monomers, and optional acidic comonomer, and crosslinker. The adhesive is used to improved adhesion of tape to automotive parts for improved acid-rain resistance.

DETAILED DESCRIPTION OF THE INVENTION

This invention relates to an amphiphilic pressure sensitive adhesive composition suitable for securing a medical device to human skin, wherein the pressure sensitive adhesive comprises a copolymer of at least one hydrophobic acrylic monomer or oligomer and at least one hydrophilic or amphiphilic monomer or oligomer, such that the amphiphilic copolymer:
a) is crosslinked,
b) does not dissolve in aqueous medium,
c) absorbs less than 10% of its weight in the presence of water or moisture,
d) is peelable from human skin and does not leave residue,
e) remains adherent to skin under wet conditions, and
f) has a glass transition temperature below 25° C.

The hydrophobic monomer or oligomer is a long chain acrylate selected from butyl acrylate, iso-octyl acrylate, n-octyl acrylate, 2-ethylhexyl acrylate, and combinations thereof. The hydrophilic or amphiphilic monomer or oligomer is selected from acrylamides, N-alkylacrylamides, N,N-dialkylacrylamides, N-alkylaminoalkylacrylamides, methacrylamides, amino methacrylates, N-alkylamino acrylates, N,N-dialkylamino acrylates, N-alkylamino methacrylates, acrylamido alkylsulfonic acid and its salts, N-vinylpyrrolidones, N-vinylcaprolactams, and combinations thereof.

The pressure sensitive adhesive composition of the present invention has a 180-deg peel strength below 20 N/in to Stainless Steel plate as tested per ASTM D3330 with minimal residue on the plate.

The amphiphilic pressure sensitive adhesive of the present invention is suitable to secure a medical device such as an ostomy appliance, wound dressing, surgical device, catheter, intravenous delivery device, or infusion device.

Furthermore, when the present invention utilizes an amphiphilic copolymer of iso-octyl acrylate (IOA), as the hydrophobic acrylic monomer, N-isopropylacrylamide (NIPAM) as the hydrophilic or amphiphilic monomer, and ethylene glycol dimethacrylate (EGDMA) as the crosslinker at a weight ratio of at least 3/1/0.05 (IOA/NIPAM/EGDMA), a particularly effective pressure sensitive adhesive results for securing a medical device to the body.

The present invention further includes a pressure sensitive adhesive composition suitable for securing a medical device to biological surfaces comprising 0.1-100% of an amphiphilic copolymer of at least one hydrophobic acrylic monomer or oligomer and at least one hydrophilic or amphiphilic monomer or oligomer that does not leach out in the presence of moisture.

The amphiphilic copolymer of the present invention is a block, alternating, random, branched, graft copolymer, or combinations thereof.

Hydrophobic and hydrophilic or amphiphilic monomers are difficult to copolymerize due to their incompatibility. In addition, hydrophilic monomers could absorb significant amounts of water or moisture under moist condition and swell which could affect adhesion.

In pressure sensitive adhesives, the balance between dry adhesion and clean removal (residue-free) from the adhered surface, which is directly related to the cohesive strength of the adhesive, is difficult to optimize since they are inversely related. One approach to optimize the two properties is to crosslink the adhesive. Typically, crosslinking reduces dry adhesion. Crosslinking can be physical or chemical in nature. Chemical crosslinks occur due to covalent bonding of more than two polymer chain segments together. Physical crosslinks occur by physical entanglements of polymer chains, and if the polymer chains have a high glass transition temperature, this results in a hard phase. Ionic interactions between groups on a polymer chain can also result in a hard phase which can act as a crosslinked polymer. In the present invention, crosslink refers to chemical crosslinks.

Surprisingly it has been found that copolymerizing certain hydrophobic acrylate monomers and hydrophilic or amphiphilic monomers with suitable chemical crosslinker, yields adhesives with good adhesion to skin, even when the skin is perspiring with no cold flow or residue after removal from the adhered surface.

Since the water or moisture sensitive component does not dissolve in water, and does not absorb water or moisture greater than 10% by weight, it is able to maintain its cohesive and adhesive strength in a wet environment.

Amphiphilic Copolymers

Synthesis of Amphiphilic N-Isopropylacrylamide and Iso-Octyl Acrylate Copolymers The typical synthetic procedure of the amphiphilic copolymers, via free radical polymerization, is as follows using poly(N-isopropyl acrylamide(NIPAM)-co-iso-octyl acrylate (IOA)) (1:4 wt) as an example: 2.4 g IOA and 0.6 g NIPAM were added into a 25 ml pressure resistant reaction flask. Then 0.022 g Vazo 67 was transferred into the flask. To the flask was then added 7 g ethyl acetate to afford a 30 wt % solution. The mixture was gently shaken until a clear solution was obtained. It was then flushed with nitrogen for 2 minutes, sealed, and let sit in a 59° C. oil bath for 6 hours. Following this, the solvent was evaporated at room temperature for 12 hours to produce a more concentrated solution, which was then cast onto PET film and further dried for 12 hours at room temperature. The copolymer, a tacky solid, was washed with methanol three times and then dried at 45° C. for 12 hours. Similarly other copolymers were synthesized with iso-octyl methacrylate (IOMA), methacrylic acid (MA), N-vinylcaprolactam (NVCL), diacetone acrylamide (DAAM), and N,N-dimethylacrylamide (DMA).

For polymers incorporating EGDMA as a crosslinking agent, castable solutions were obtained by the above procedure with EGDMA concentrations of 0.5 wt % and below, based upon total polymer weight. Thus, for a composition of NIPAM/IOA 1/3+0.5 wt % EGDMA (crosslinked) (see Table 6), the wt % composition of the three ingredients is 24.9 wt % NIPAM/74.6 wt % IOA/0.5 wt % EGDMA.

Pressure Sensitive Adhesive Tapes

The typical procedure for the preparation of a pressure sensitive adhesive tape (cast film) of the present invention is as follows: A polymer solution in isooctane (20% wt) was coated on a polyurethane film and allowed to sit at room temperature for 12 hours, followed by drying at 60° C. for 5 hours for evaporation of solvent. The dry and wet adhesion of the copolymers were evaluated under laboratory conditions by pressing a tongue depressor on the cast films for a defined period of time. Dry adhesion (tack) was evaluated under ambient conditions. To determine wet adhesion, the tongue depressor was soaked in water and then pressed onto the cast films. These studies were also conducted utilizing a dry and wet finger instead of a tongue depressor. Select compositions were also evaluated on human subjects by applying a 1 inch by 1 inch strip of adhesive (coated onto polyurethane film) onto dry abdominal skin. Following 40-60 minutes of aerobic activity, inducing sweating, the adhesive film was removed. Good correlation of human subject testing was found with the laboratory test methods.

The results of the adhesion studies under dry and wet conditions are shown in Tables 1-8, utilizing monomer combinations of N-isopropylacrylamide (NIPAM), iso-octyl acrylate (IOA), iso-octyl methacrylate (IOMA), N-vinylcaprolactam (NVCL), methacrylic acid (MA), diacetone acrylamide (DAAM), N,N-dimethylacrylamide (DMA), and ethylene glycol dimethacrylate (dimer, EGDMA).

Examples

Table 1 shows the results of tongue depressor adhesion tests on adhesives based on NIPAM and IOA. It can be seen that NIPAM/IOA weight ratio of 1:2 the dry and wet adhesion are not sufficient while the cohesive strength is very good. At higher IOA levels in the copolymer, the dry and wet adhesion increase, while the cohesive strength decreases but is still acceptable. Even though NIPAM/IOA at weight ratios of 1/3 and 1/4 were found to be acceptable, they exhibited cold flow at the edges of the tape, which is not desirable.

TABLE 1

Adhesion of Poly(N-isopropylacrylamide-co-iso-octyl acrylate)

| Polymer | Dry adhesion[a] | Wet adhesion[b] | Cohesive strength[c] |
|---|---|---|---|
| NIPAM/IOA (1:2) (uncrosslinked) | 0.5/0.5 | 0 | 5 |
| NIPAM/IOA (1:2.5) (uncrosslinked) | 2/2.5 | 0.5 | 3.5 |
| NIPAM/IOA (1:3) (uncrosslinked) | 2.5/3.5 | 0.5 | 3 |
| NIPAM/IOA (1:4) (uncrosslinked) | 3.5/4 | 1 | 2 |
| NIPAM/IOA (1:5) (uncrosslinked) | 4.5/5 | 1.5 | 2 |

[a]Dry Adhesion: adhesion after pressing adhesive with tongue depressor for ~0.5 seconds/adhesion after pressing for ~10 seconds (No adhesion - 0; Excellent adhesion - 5); dry adhesion rating of 2 or greater is acceptable
[b]Wet Adhesion: adhesion after pressing adhesive with tongue depressor for ~0.5 seconds; No adhesion - 0; Excellent adhesion - 5; wet adhesion rating of 0.5 or greater is acceptable
[c]Cohesive Strength: Low cohesion - 0; Excellent cohesion - 5; Cohesive strength rating of 2 or greater is acceptable Table 2 shows that at NIPAM/IOMA 1/4 ratio, the cohesive strength increased but the dry and wet adhesion dropped. Accordingly, it was determined that IOMA is not a desirable comonomer for the present invention.

TABLE 2

Comparison of iso-octyl acrylate and iso-octyl methacrylate

| Polymer | Dry adhesion | Wet adhesion | Cohesive strength |
|---|---|---|---|
| NIPAM/IOMA (1:4) (uncrosslinked) | 2/3 | 0 | 3 |
| NIPAM/IOA (1:4) (uncrosslinked) | 3.5/4 | 1 | 2 |

Table 3 shows the adhesion results for uncrosslinked copolymers of IOA and NVCL. At IOA/NVCL ratio of 4/1, the dry adhesion is good but the cohesive strength is not desirable. Possibly, crosslinking this composition could result in an amphiphilic pressure sensitive adhesive with better cohesive strength.

TABLE 3

Adhesion of Poly(iso-octyl acrylate-co-N-vinylcaprolactam)

| Polymer | Dry Adhesion | Wet Adhesion | Cohesive Strength | Calculated $T_g$ (° C.) |
|---|---|---|---|---|
| IOA/NVCL (1/1) (uncrosslinked) | 0 | 0 | 5 | 12 |
| IOA/NVCL (1.5/1) (uncrosslinked) | 1.5 | 0 | 4 | −5 |

TABLE 3-continued

Adhesion of Poly(iso-octyl acrylate-co-N-vinylcaprolactam)

| Polymer | Dry Adhesion | Wet Adhesion | Cohesive Strength | Calculated $T_g$ (° C.) |
|---|---|---|---|---|
| IOA/NVCL (2/1) (uncrosslinked) | 2.5 | 0 | 3 | −15 |
| IOA/NVCL (4/1) (uncrosslinked) | 5 | 1.5 | 1.5 | −34 |

Table 4 shows that with hydrophilic monomer such as methacrylic acid, the balance between adhesion and cohesive strength is difficult to achieve except at very high IOA to MA weight ratio such as 16/1. At the ratio of IOA/MA 16/1, the adhesive has poor cohesive strength.

TABLE 4

Adhesion of Poly(Iso-octyl acrylate-co-methacrylic acid)

| Polymer | Dry Adhesion | Wet Adhesion | Cohesive Strength |
|---|---|---|---|
| IOA/MA (4/1) (uncrosslinked) | 0/0 | 0 | 5 (brittle) |
| IOA/MA (7/1) (uncrosslinked) | 0/0 | 0 | 5 (brittle) |
| IOA/MA (12/1) (uncrosslinked) | 2/3.5 | 0 | 3.5 |
| IOA/MA (16/1) (uncrosslinked) | 4/>5 | 1.5 | 1 |

Tables 5 and 6 show the effect of crosslinking on the adhesion properties of NIPAM/IOA copolymers in a human wear test. The test involved attaching a 1"×1" piece of the adhesive tape on to the dry abdominal skin of a human subject. This was followed by 40-60 minutes of aerobic activity, inducing sweating, and then the adhesive tape was removed. As shown in Table 5, the addition of crosslinkers, polybutadiene dimethacrylate (dimer) or trimethylolpropane trimethacrylate (trimer), surprisingly gave an adhesive composition with good dry and wet adhesion and with improved cohesive strength.

Similarly, Table 6 shows that crosslinking the NIPAM/IOA composition with ethylene glycol dimethacrylate (EGDMA), increases the cohesive strength (reducing cold flow at the edges) while maintaining good dry and wet adhesion.

TABLE 5

Adhesion testing in human subject (crosslinked vs. uncrosslinked adhesives)

| Sample | Dry adhesion[1] | Wet adhesion[2] | Cohesive strength[3] on removal |
|---|---|---|---|
| NIPAM/IOA 1/4 (uncrosslinked) | 5 | 5 | 2 |
| NIPAM/IOA 1/3.5 (uncrosslinked) | 4 | 5 | 3 |
| NIPAM/IOA/Dimer 1/3.5/0.1 (crosslinked) | 4 | 5 | 4 |
| NIPAM/IOA/Dimer 1/3.5/0.2 (crosslinked) | 4 | 5 | 4 |
| NIPAM/IOA/Trimer 1/3.5/0.2 (crosslinked) | 4 | 5 | 4 |

Dry adhesion[1]: adhesive tape applied to dry skin and removed under dry conditions; No adhesion - 0; high adhesion - 5; Dry adhesion rating of 3 or more is acceptable
Wet adhesion[2]: adhesive tape applied to dry skin; removed under sweating conditions; no adhesion - 0; high adhesion - 5; Wet adhesion rating of 2 or more is acceptable
Cohesive strength[3] on removal: Low cohesive strength - 0; high cohesive strength - 5; Cohesive strength rating of 4 or more is acceptable

TABLE 6

Adhesion testing in human subject (crosslinked vs. uncrosslinked adhesives)

| Sample | Dry adhesion[1] | Wet adhesion[2] | Cohesive strength[3] on removal |
|---|---|---|---|
| NIPAM/IOA 1/4 (uncrosslinked) | 5 | 5 | 2 |
| 1. NIPAM/IOA 1/4 + 0.2% EGDMA (crosslinked) | 5 | 5 | 5 |
| 2. NIPAM/IOA 1/4 + 0.5% EGDMA (crosslinked) | 4 | 5 | 5 |
| 3. NIPAM/IOA 1/3 + 0.2% EGDMA (crosslinked) | 3 | 5 | 5 |
| 4. NIPAM/IOA 1/3 + 0.5% EGDMA (crosslinked) | 3 | 5 | 5 |

Dry adhesion[1]: adhesive tape applied to dry skin and removed under dry conditions; No adhesion - 0; high adhesion - 5; Dry adhesion rating of 3 or more is acceptable
Wet adhesion[2]: adhesive tape applied to dry skin; removed under sweating conditions; no adhesion - 0; high adhesion - 5; Wet adhesion rating of 2 or more is acceptable
Cohesive strength[3] on removal: Low cohesive strength - 0; high cohesive strength - 5; Cohesive strength rating of 4 or more is acceptable The adhesion of NIPAM/IOA adhesives to Stainless Steel (SS) was tested using a 4 inch×1 inch wide tape of the adhesive coated on 1-mil polyurethane film (adhesive coating thickness around 6-7 mils) per ASTM D3330. The SS peel value for the crosslinked NIPAM/IOA/EGDMA amphiphilic copolymer adhesive is about 8-16 N/in with no residue on the plate.

The water uptake or moisture absorbency was measured using ASTM E-96 Method D at 37° C. The water uptake of NIPAM/IOA/EGDMA adhesive (1/4/0.35 wt ratio) was less than 10%. The water uptake for a hydrocolloid adhesive would be about a few hundred percent due to the presence of hydrophilic fillers, leading to an adhesive that swells, leaches, and possibly delaminate from skin. An amphiphilic copolymer adhesive according to the present invention with a water uptake of <10% avoids delamination from skin due to hydration or swelling. It should be noted that none of the amphiphilic copolymers of the present invention dissolved in water.

The glass transition temperature (Tg) of NIPAM/IOA/EGDMA (1/4/0.35 wt ratio) was measured using dynamic scanning calorimetry (DSC). Two Tg's were measured for the amphiphilic copolymer adhesive at −16° C. and +3.9° C. Amphiphilic copolymers of the present invention having Tgs below 25° C. are suitable for attaching medical devices to human skin.

We claim:

1. An amphiphilic pressure sensitive adhesive composition suitable for securing a medical device to human skin, wherein the pressure sensitive adhesive comprises an amphiphilic copolymer of at least one hydrophobic acrylic monomer or oligomer; at least one hydrophilic or amphiphilic monomer or oligomer; and a crosslinker, wherein the hydrophilic or amphiphilic monomer or oligomer is selected from acrylamides, N-alkylacrylamides, N,N-dialkylacrylamides, N-alkylaminoalkylacrylamides, methacrylamides, amino methacrylates, N-alkylamino acrylates, N,N-dialkylamino acrylates, N-alkylamino methacrylates, acrylamido alkylsulfonic acid and its salts, N-vinylpyrrolidones, N-vinylcaprolactams, and combinations thereof; and the crosslinker is selected from polybutadiene dimethacrylate, trimethylolpropane trimethacrylate, and ethylene glycol dimethacrylate, wherein the crosslinker is present at 0.2 to 0.5 wt %; such that the amphiphilic copolymer:
- a) is crosslinked in solution and is castable after crosslinking,
- b) does not dissolve in aqueous medium,
- c) absorbs less than 10% of its weight in the presence of water or moisture,
- d) is peelable from human skin and does not leave residue,
- e) remains adherent to skin under wet conditions,
- f) has a glass transition temperature below 25° C., and
- g) wherein the 180-deg peel strength of the adhesive to Stainless Steel plate tested per ASTM D3330 is below 20 N/in with minimal residue on the plate.

2. The pressure sensitive adhesive composition according to claim 1, wherein the hydrophobic monomer or oligomer is a long chain acrylate selected from butyl acrylate, iso-octyl acrylate, n-octyl acrylate, 2-ethylhexyl acrylate, and combinations thereof.

3. The amphiphilic pressure sensitive adhesive composition according to claim 1, wherein the medical device is an ostomy appliance, wound dressing, surgical device, catheter, intravenous delivery device, or infusion device.

4. The amphiphilic pressure sensitive adhesive composition according to claim 1, wherein the hydrophobic acrylic monomer is iso-octyl acrylate (IOA) the hydrophilic or amphiphilic monomer is N-isopropylacrylamide (NIPAM), the crosslinker is ethylene glycol dimethacrylate (EGDMA), wherein the IOA, NIPAM, and EGDMA are present in amounts of 75-80 wt %, 20-25 wt % and 0.2 to 0.5 wt %, respectively.

* * * * *